US007654189B2

(12) United States Patent
Kohlmeyer et al.

(10) Patent No.: US 7,654,189 B2
(45) Date of Patent: Feb. 2, 2010

(54) HEAVY DUTY CYLINDER

(75) Inventors: Bruce E. Kohlmeyer, Buffalo Grove, IL (US); Stanley Paul Evans, Jr., Tinley Park, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 289 days.

(21) Appl. No.: 11/738,928

(22) Filed: Apr. 23, 2007

(65) Prior Publication Data

US 2008/0257297 A1 Oct. 23, 2008

Related U.S. Application Data

(60) Provisional application No. 60/852,729, filed on Oct. 18, 2006.

(51) Int. Cl.
*F16J 10/00* (2006.01)
*F15B 15/00* (2006.01)

(52) U.S. Cl. ...................... 92/169.1; 92/163; 92/165 R

(58) Field of Classification Search .................. 92/163, 92/164, 165 R, 169.1, 169.2
See application file for complete search history.

(56) References Cited

U.S. PATENT DOCUMENTS

| | | | | |
|---|---|---|---|---|
| 3,150,570 | A * | 9/1964 | Johnson et al. | 92/169.1 |
| 3,395,620 | A * | 8/1968 | Schmoeger | 92/169.1 |
| 3,559,539 | A * | 2/1971 | Nagy | 92/169.1 |
| 3,811,367 | A * | 5/1974 | Bimba | 92/169.1 |
| 4,337,687 | A * | 7/1982 | Hoover | 92/164 |
| 4,643,332 | A * | 2/1987 | Bimba | 220/327 |
| 6,691,607 | B2 * | 2/2004 | Vatterott et al. | 92/240 |
| 2006/0016329 | A1 * | 1/2006 | Johnson | 92/169.1 |

* cited by examiner

*Primary Examiner*—Thomas E Lazo
(74) *Attorney, Agent, or Firm*—Renner, Otto, Boisselle & Sklar, LLP

(57) ABSTRACT

A cylinder for a piston-cylinder assembly comprises an extruded stainless steel cylinder body and stainless steel end caps mounted to opposite ends of the body. A unique configuration of three seals is used to seal each end cap to the cylinder body.

18 Claims, 3 Drawing Sheets

HEAVY DUTY CYLINDER

RELATED APPLICATION

This application claims priority of U.S. Provisional Application No. 60/852,729 filed Oct. 18, 2006 and entitled "Heavy Duty Sanitary Design Stainless Steel Hydraulic Cylinder", which is hereby incorporated herein by reference.

FIELD OF THE INVENTION

The herein described invention relates generally to heavy duty piston-cylinder assemblies and more particularly to such assemblies where a high level of cylinder seal integrity is demanded.

BACKGROUND OF THE INVENTION

In some applications using heavy duty cylinders, corrosion resistance and a high level of seal integrity are demanded, either to protect against fluid leaks to the environment in the food industry, for example, or from the environment contaminating the fluid in the cylinder in the offshore hydrocarbon production industry, for example. Another concern in the food industry is the ability to easily clean the exterior of the cylinders.

Traditional steel cylinders that use tie rods provide collection points for contaminants and, the steel material of such cylinders is subject to severe corrosion. Stainless steel offers high corrosion resistance, but the tie rods still provide collection points for contaminants. Welding the cylinder parts would eliminate the need for tie rods, but welding negatively impacts the corrosion resistance of the stainless steel and repair.

Lobed, extruded aluminum bodies are currently used in low pressure (approximately 250 psi or less) pneumatic applications. Stainless steel tie rod type cylinders, both hydraulic and pneumatic are also known, but suffer from the aforesaid drawbacks.

SUMMARY OF THE INVENTION

The present invention provides a cylinder for a piston-cylinder assembly that comprises an extruded stainless steel cylinder body and stainless steel end caps mounted to opposite ends of the body. A unique configuration of three seals is used to seal each end cap to the cylinder body.

In a preferred embodiment, the three seal configuration includes one metal-to-metal seal and two elastomeric seals.

The end caps may have a stepped configuration forming a pilot portion insertable into the cylinder body and pilot surfaces for spacing the seals in series relative to one another.

The cylinder body may have a lobed cross-sectional shape with the lobes forming thicker wall portions that have formed therein threaded bores opening to respective end faces of the body. The end caps may have through bolt holes aligned with the threaded bores at the respective end of the body. The end caps may be secured to the ends of the body by bolts having shanks extending through respective through holes in the respective end caps and threaded end portions threaded into respective threaded bores.

Each bolt may have an enlarged head, and a sealing washer may be sandwiched between the head and an end face of the respective end cap. The sealing washer may have a radially outer metal washer portion and an elastomeric annular center portion deformed into the bolt hole for sealing between the bolt hole and shank of the fastener.

The foregoing cylinder construction enables the provision of a cylinder that can be used with high pressures, such as equal or greater than 2000 psi., and rated as high as 3000 psi if not higher.

Further features of the invention will become apparent from the following detailed description when considered in conjunction with the drawings.

DETAILED DESCRIPTION

Figure 1:
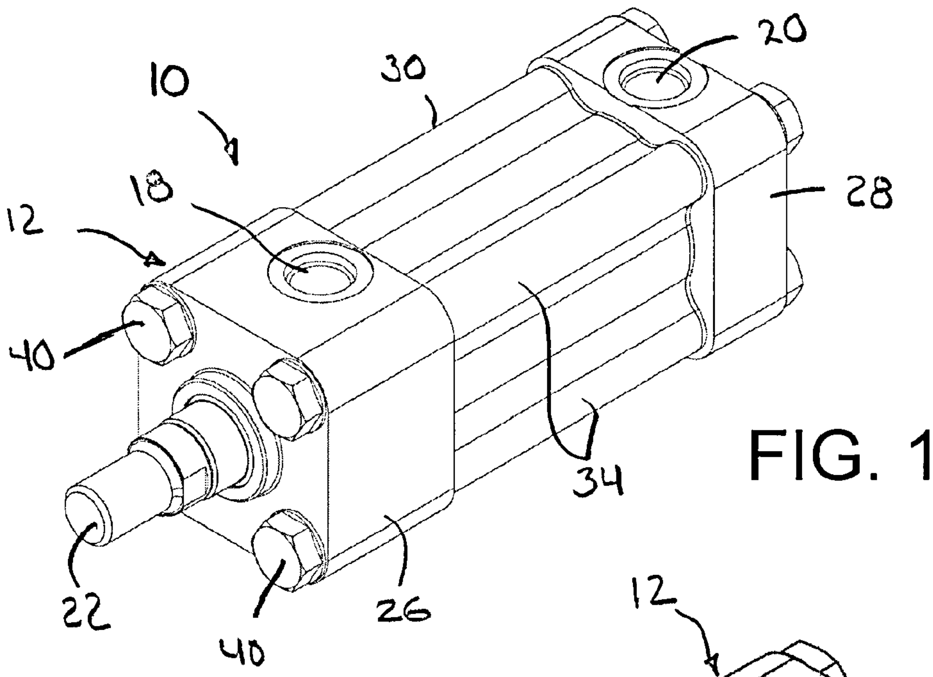
FIG. 1 is a perspective view of an exemplary piston-cylinder assembly according to the invention.
Figure 2:
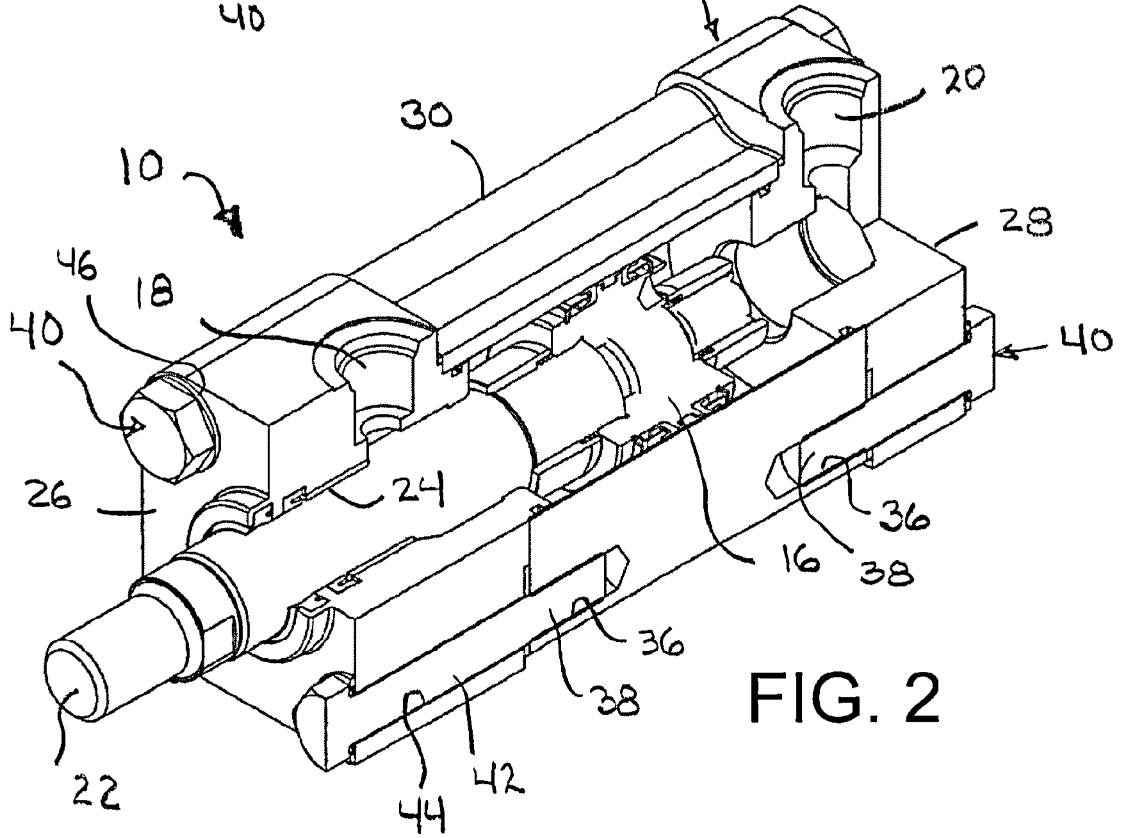
FIG. 2 is a perspective view similar to FIG. 1, but partly broken away in section.
Figure 3:
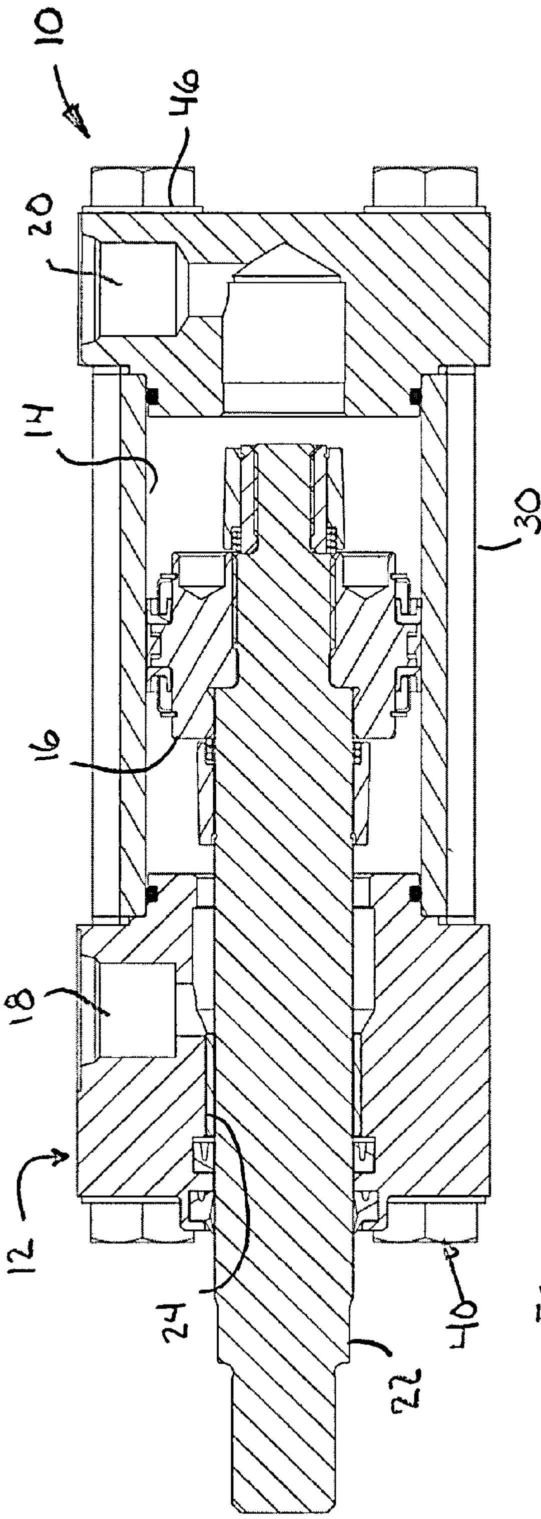
FIG. 3 is a cross-sectional view of the piston-cylinder assembly.

Referring now to the drawings in detail and initially to FIGS. 1-3, an exemplary piston-cylinder assembly according to the invention is designated generally by reference numeral 10. The assembly 10 includes a cylinder 12 having a bore 14 in which is piston 16 reciprocates. The piston is suitably sealed to the bore to form fluid chambers on opposite sides of the piston to which pressurized fluid can be supplied via ports 18 and 20 in a conventional manner for extension and retraction of a piston rod 22 to which the piston is attached. The piston rod extends through a bore 24 in one end cap 26, and a suitable bearing and seals are provided for sealing the piston rod to the end cap. The cylinder also has another end cap 28, and the end caps 26 and 28 are assembled to opposite ends of a cylinder body 30 in which the bore 14 is formed. Although not shown, the end cap 28 may have a rod bore for a piston rod extending from the other side of the piston.

The cylinder body 30 is extruded from stainless steel. For sanitary applications in particular, the extruded cylinder body has a lobed cross-sectional shape with the lobes forming thicker wall portions 34 that may be provided with threaded bores 36 for threaded receipt of the threaded end portions 38 of fasteners, in particular bolts 40, used to secure the stainless steel end caps to the ends of the cylinder body as seen in FIG. 2. The lobed exterior surface of the cylinder body provides smooth rounded surfaces to facilitate cleaning of the cylinder. In the illustrated embodiment, there are four quadrant spaced lobes and four fasteners for each end cap. As seen in FIG. 2, the fastener bolts have unthreaded shank portions 42 extending through bores 44 in the end caps.

Figure 4:
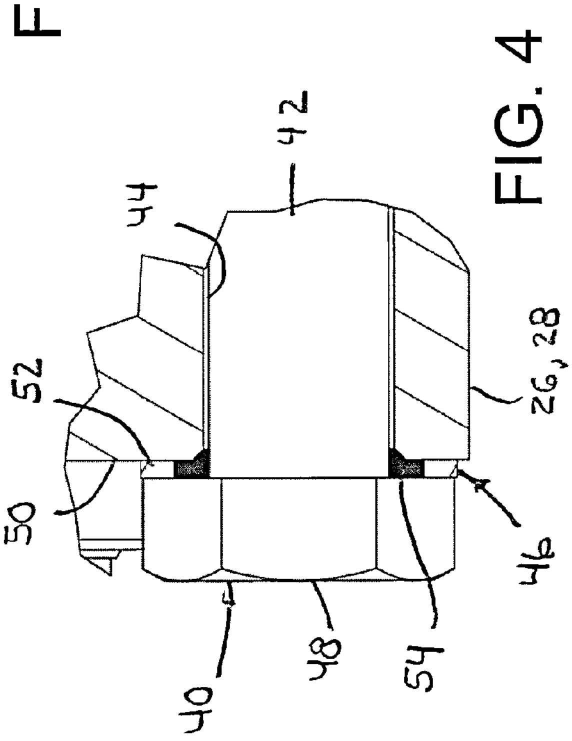
FIG. 4 is an enlarged fragmentary cross-sectional view showing a sealing washer interposed between a head of a bolt and an end cap.

As seen in FIG. 4, a sealing washer 46 is provided between the head 48 of each fastener 40 and the end face 50 of the end cap 26, 28 to enhance the sanitary design aspects of the cylinder. The sealing washer 46 has a radially outer washer portion 52 preferably made of stainless steel and an elastomeric annular center portion 54. The elastomeric center portion preferably is molded to the washer portion, and the washer portion may have recesses or holes into which portions of the elastomeric center portion are molded to provide a mechanical interlock, as in a manner similar to that described in U.S. patent application Ser. No. 11/676,716, which is hereby incorporated herein by reference. Suitable sealing washers are available from the Composite Sealing Systems Division of Parker-Hannifin Corporation of Cleveland, Ohio.

When not installed, the elastomeric center portion 54 has a thickness greater than the thickness of the washer portion 52. The elastomeric seal portion preferably also has a radial thickness substantially greater than the radial gap between the fastener shank and the bolt hole 44. In addition the elastomeric seal may have an inside diameter closely corresponding the outer diameter of the shank. The elastomeric seal portion may be generally round in cross-section, like an O-ring, with an axial thickness greater than the axial thickness of the washer portion. When the head 48 of the fastener is tightened against the end face 50 of the end cap 26, 28, the elastomeric sealing portion 54 will deform into the slightly oversized bolt hole 44 while the washer portion controls the extent to which this can occur by setting a spacing between the bolt head and end cap. This prevents fluids and contaminants from entering the internal portions of the cylinder.

Figure 5:
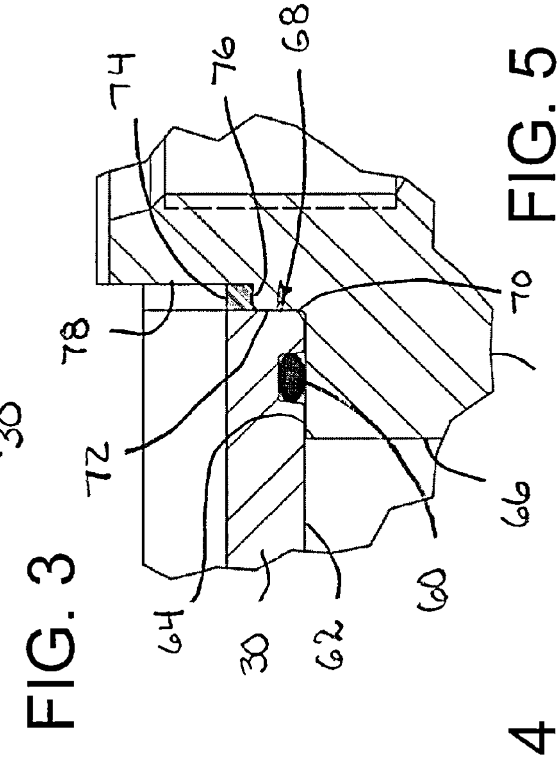
FIG. 5 is an enlarged fragmentary cross-sectional view showing a configuration of three seals for sealing each end cap to the cylinder body.

With reference to FIGS. 3 and 5, the cylinder body 30 is sealed to each end cap 26, 28 by three distinct seals to prevent fluid leakage, while at the same time preventing harmful contaminants from either entering the cylinder or collecting at the joint between the cylinder body extrusion and the cylinder end caps. As seen in FIG. 5, the end seal configuration includes a first annular seal 60, such as an elastomeric O-ring, sealing the inner diameter surface 62 of the cylinder body to an outer diameter surface 64 of a cylindrical pilot portion 66 of the end cap that is telescopically inserted into an end of the through bore 14 through the cylinder body. A second annular seal 68 is a metal-to-metal seal between the end face 70 of the cylinder body and an opposed axially facing surface 72 of the end cap. A third annular seal 74, such as an elastomeric gasket, is piloted on a stepped shoulder portion 76 of the end cap and is squeezed between an end cap face 78 and the end face 70 of the cylinder body. The stepped configuration provided by the shoulder portion 76 and pilot portion 66 enable the three seals 60, 68 and 74 to be spaced in series relative to one another. The stepped shoulder portion may follow the contour of the outer diameter surface of the cylinder body so that the radially outer surface of a uniform radial width seal 74 will remain substantially flush to the outer surface of the cylinder body, in which case the seal will have a lobed shape matching the lobed cross-sectional shape of the cylinder body. In an alternative arrangement that makes it easier to machine the end caps, the shoulder portion 76 may be cylindrical, and the seal 74, more typically referred to as a gasket, may have an inner cylindrical hole corresponding to the diameter of the shoulder portion, and a variable radial width such that the radially outer surface of the seal 74 will follow the contour of the radially outer surface of the cylinder body at its interface with the end cap.

Accordingly, each end cap 26, 28 may be assembled to a respective end of the cylinder body 30 by installing the seal 60 in a retention groove 80 provided in the outer diameter surface of the pilot portion 66 and the gasket 74 on the shoulder portion 76. The pilot portion is then inserted into the end of the cylinder body to effect the three seals. The end cap can then be secured to the cylinder body by the fasteners 40 that may be tightened to a prescribed pre-load, with the cylinder body being sandwiched between the end caps.

Before final cylinder assembly, the stainless steel cylinder body 30 and end caps 26 and 28 may be electro-polished. This will improve the corrosion resistance of the stainless steel and will smooth out the surface such that contaminants are less likely to adhere to the cylinder when in use. Electro-polishing the components also imparts some properties to the stainless steel that inhibit bacterial growth on the exterior surfaces.

Alternative exemplary configurations for the end seals are illustrated in FIGS. 6-9. One or more aspects of the above and alternative configurations can be combined in other configurations, as will be appreciated by those skilled in the art. In FIGS. 6-9, like reference numerals are used to designate like parts.

Figure 6:
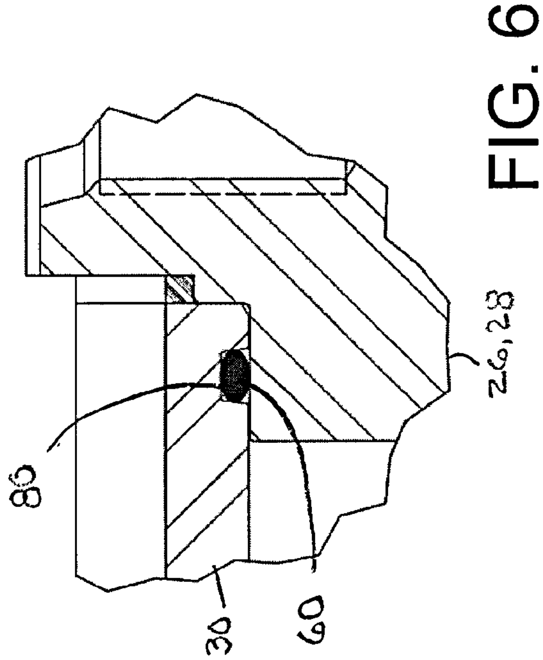

As seen in FIG. 6, the retention groove 80 for the seal 60 may be provided in the inner diameter surface of the cylinder body 30 instead of in the outer diameter surface of the pilot portion of the end cap 26, 28.

Figure 7:
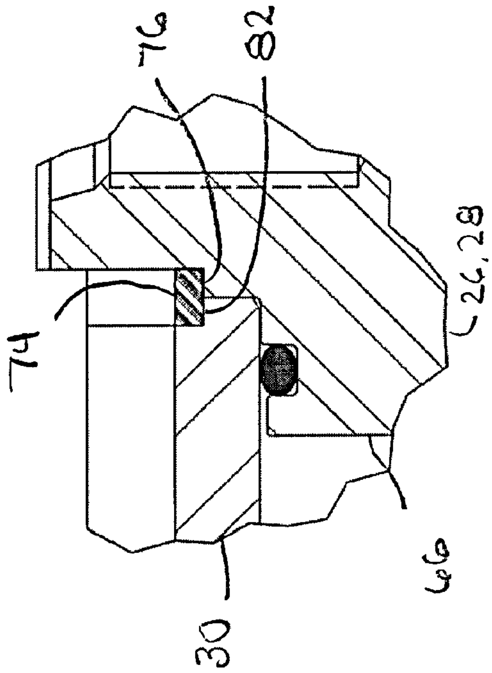

As seen in FIG. 7, the cylinder body 30 may be provided with a stepped shoulder 82 for piloting of the seal 74 or an axially inner portion of the seal 74 that may be sized to span the interface between the end of the cylinder body and mating end face of the end cap. The pilot portion 66 of the end cap 26, 28 may also have a slightly reduced diameter distal portion between the seal 60 and the distal end of the pilot portion, and a proximal portion having an outer diameter providing a tight fit with the inner diameter of the cylinder bore. The outer diameter of this proximal portion may be made slightly larger in diameter than the cylinder bore if it is desired to provide a press fit connection and a corresponding metal-to-metal seal at such location. The feature, as above noted, can be used in any of the various seal configurations except that shown in FIG. 8.

Figure 8:
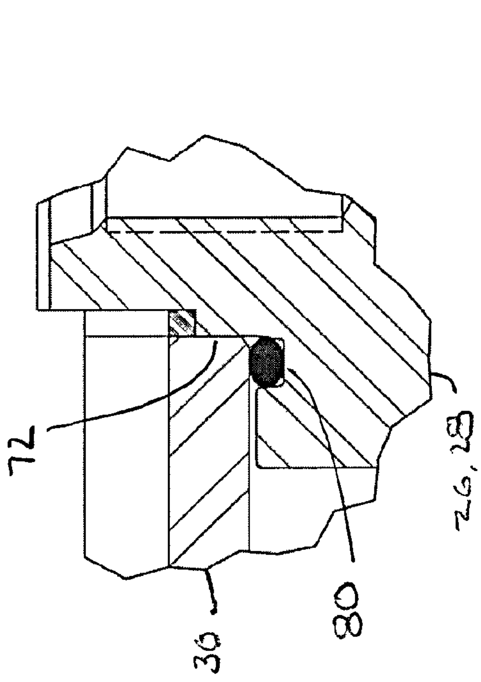

As seen in FIG. 8, the groove 80 for the seal 60 can be provided adjacent the surface 72 such that the seal may be squeezed not only radially but axially.

Figure 9:
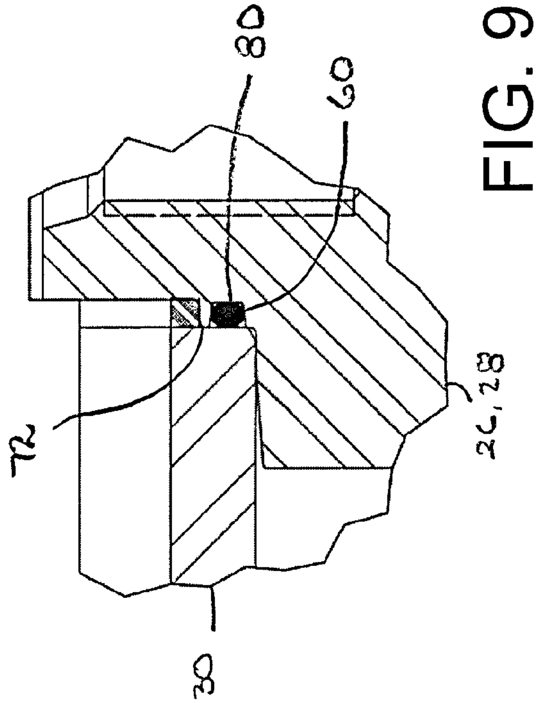
FIGS. 6-9 show alternative seal configurations according to the present invention.

As seen in FIG. 9, the groove 80 for the seal 60 can be provided in the surface 72 to provide an end face seal. FIG. 9 also shows the stepped pilot surface described above in connection with FIG. 7. Additionally, it can be seen how the distal end portion of the pilot portion may be tapered to provide a guide surface to facilitate assembly.

As will be appreciated by those skilled in the art, the use of stainless steel significantly improves corrosion resistance relative to aluminum and conventional alloy and carbon steels. The higher tensile strength of stainless steel over aluminum also allows for the use of the cylinder 12 in high pressure heavy duty applications operating at pressures equal or greater than 1000 psi, or equal or greater than 2000 psi, or equal or greater than 3000 psi.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cylinder for a piston-cylinder assembly, comprising an extruded stainless steel cylinder body, and stainless steel end caps mounted to opposite ends of the body, wherein the body has a lobed cross-sectional shape with the lobes forming thicker wall portions that have formed therein threaded bores opening to respective end faces of the body, the end caps have through bolt holes aligned with the threaded bores at the respective end of the body, and wherein the end caps are secured to the ends of the body by bolts having shanks extending through respective through holes in the respective end caps and threaded end portions threaded into respective threaded bores.

2. The cylinder of claim 1, wherein a three seal configuration of seals is located between each end cap and the body.

3. The cylinder of claim 2, wherein the three seal configuration includes one metal-to-metal seal and two elastomeric seals.

4. The cylinder of claim 2, wherein one of the end caps and the body includes a stepped configuration for spacing the seals in series relative to one another.

5. The cylinder of claim 1, wherein the cylinder is configured for use with high pressure fluid.

6. The cylinder of claim 1, wherein the end cap has a cylindrical pilot portion telescoped into an adjacent end of the body.

7. The cylinder of claim 6, wherein an annular elastomeric seal is interposed between the pilot portion and the body.

8. The cylinder of claim 1, wherein the stainless steel body and end caps are electro-polished.

9. The cylinder of claim 1, wherein the cylinder is configured for use at pressures equal or greater than 2000 psi.

10. A piston-cylinder assembly comprising a cylinder as set forth in claim 1, and a piston movable in the body between the end caps.

11. The piston-cylinder assembly of claim 10, wherein one of the end caps has a rod bore, and the piston has a piston rod extending therefrom and through the rod bore.

12. A cylinder for a piston-cylinder assembly, comprising an extruded stainless steel cylinder body, and stainless steel end caps mounted to opposite ends of the body, wherein the body has a lobed cross-sectional shape with the lobes forming thicker wall portions that have formed therein threaded bores opening to respective end faces of the body, the end caps have through bolt holes aligned with the threaded bores at the respective end of the body, and wherein the end caps are secured to the ends of the body by bolts having shanks extending through respective through holes in the respective end caps and threaded end portions threaded into respective threaded bores, and wherein each bolt has an enlarged head, a sealing washer is sandwiched between the head and an end face of the respective end cap, and the sealing washer has a radially outer metal washer portion and an elastomeric annular center portion deformed into the bolt hole for sealing between the bolt hole and shank of the fastener.

13. The cylinder of claim 12, wherein the elastomeric seal portion is molded to the washer portion.

14. A cylinder for a piston-cylinder assembly, comprising an extruded stainless steel cylinder body, and stainless steel end caps mounted to opposite ends of the body, wherein the end cap has a cylindrical pilot portion telescoped into an adjacent end of the body, and wherein the end cap has a stepped shoulder onto which an annular seal is piloted, which annular seal is sandwiched between opposed axial surfaces of the end cap and body.

15. The cylinder of claim 14 wherein the body has a lobed cross-sectional shape with the lobes forming thicker wall portions that have formed therein threaded bores opening to respective end faces of the body, the end caps have through bolt holes aligned with the threaded bores at the respective end of the body, and wherein the end caps are secured to the ends of the body by bolts having shanks extending through respective through holes in the respective end caps and threaded end portions threaded into respective threaded bores.

16. The cylinder of claim 14, wherein the body has a stepped shoulder corresponding to the stepped shoulder of the end cap, and the annular seal is piloted on both shoulders.

17. The cylinder of claim 16, wherein the annular seal has a radially outer annular surface flush with an adjacent radially outer annular surface of the body.

18. A piston-cylinder assembly comprising a cylinder including an extruded stainless steel cylinder body and stainless steel end caps mounted to opposite ends of the body, and a piston movable in the body between the end caps, wherein one of the end caps has a rod bore, and the piston has a piston rod extending therefrom and through the rod bore, and wherein each end cap is sealed to a respective end of the cylinder body by a serial arrangement of a first elastomeric seal, a metal-to-metal seal, and a second elastomeric seal.

* * * * *